Dec. 29, 1953

A. HALE ET AL 2,663,901

APPARATUS FOR MILLING RUBBER

Filed Nov. 4, 1950

INVENTORS
BY ANDREW HALE &
GILBERT V. KULLGREN

ATTORNEYS

INVENTORS
ANDREW HALE &
GILBERT V. KULLGREN

Dec. 29, 1953  A. HALE ET AL  2,663,901
APPARATUS FOR MILLING RUBBER
Filed Nov. 4, 1950  11 Sheets-Sheet 7

INVENTORS
ANDREW HALE &
GILBERT V. KULLGREN
BY
ATTORNEYS

Dec. 29, 1953 — A. HALE ET AL — 2,663,901
APPARATUS FOR MILLING RUBBER
Filed Nov. 4, 1950 — 11 Sheets-Sheet 8

INVENTORS
ANDREW HALE &
GILBERT V. KULLGREN
BY
ATTORNEYS

Dec. 29, 1953

A. HALE ET AL 2,663,901

APPARATUS FOR MILLING RUBBER

Filed Nov. 4, 1950

INVENTORS
ANDREW HALE &
BY GILBERT V. KULLGREN

Ely & Frye

ATTORNEYS

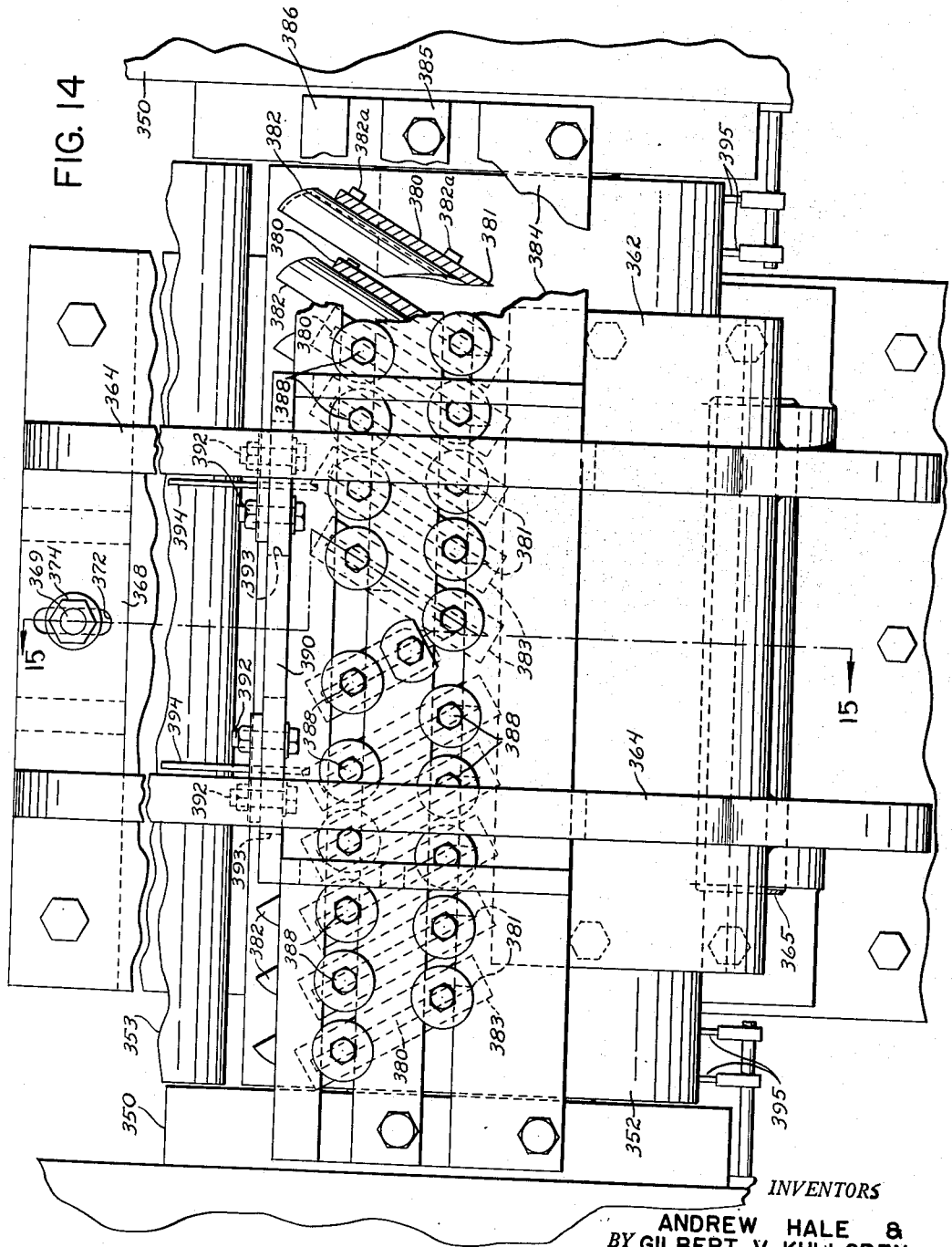

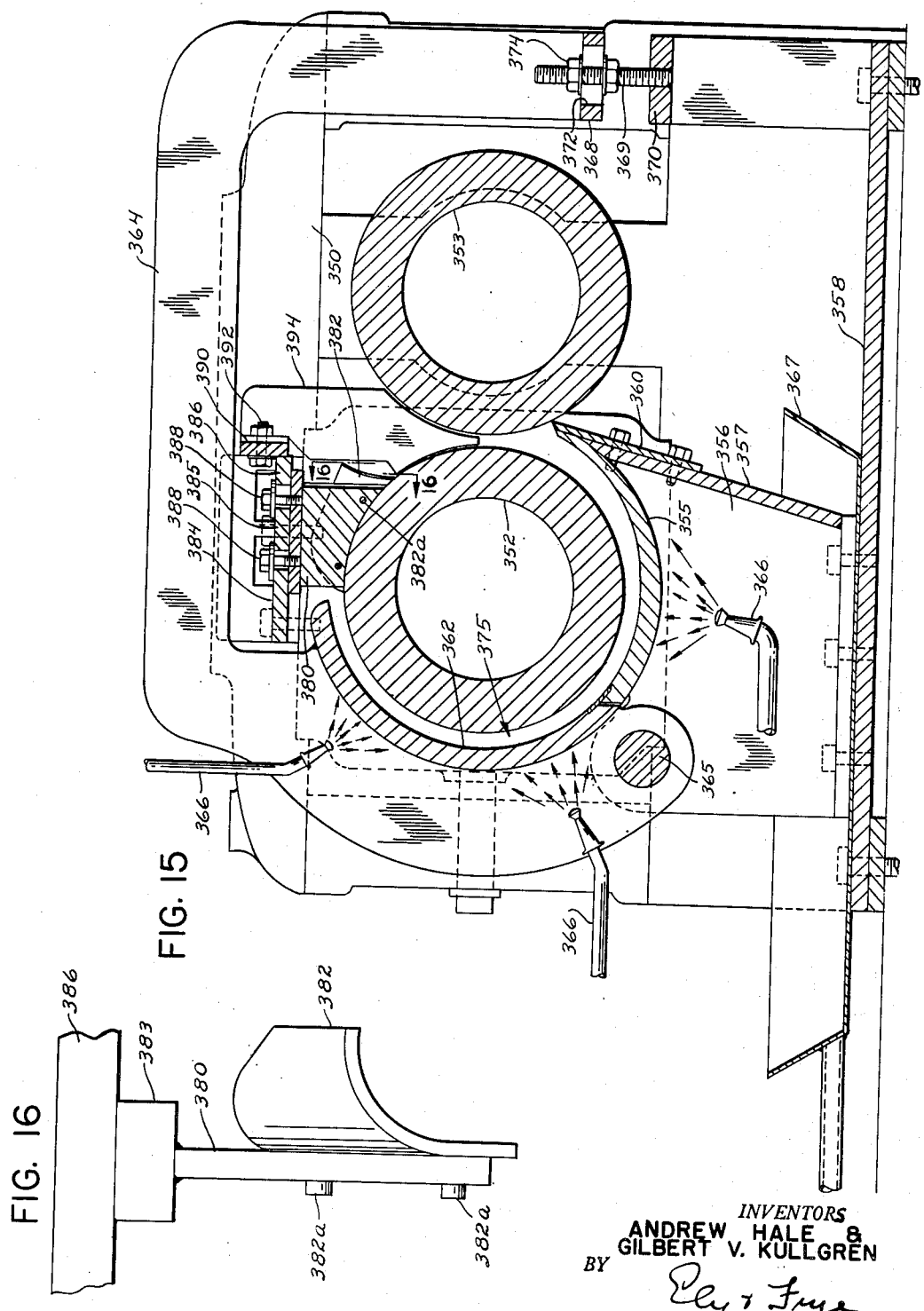

UNITED STATES PATENT OFFICE 2,663,901

APPARATUS FOR MILLING RUBBER

Andrew Hale and Gilbert V. Kullgren, Akron, Ohio, assignors, by mesne assignments, to The Aetna-Standard Engineering Company, Youngstown, Ohio, a corporation of Ohio Application November 4, 1950, Serial No. 194,123

7 Claims. (Cl. 18—2)

The present invention relates to the art of working rubber by which it is intended to include natural or reclaimed rubber, artificial or synthetic rubber, and other plastic materials of a similar nature. It will be understood, therefore, that in the description of the invention the term rubber is used in a broad sense and it is not intended to limit the application of the invention to natural or synthetic rubbers. By the term "working," as applied to rubber, it is intended to include breaking down, plasticizing, blending, and mixing with other ingredients, all of which are included in what is known as milling rubber.

Crude rubber, in order to prepare it for subsequent operations such as tubing, calendering, or the like, requires a considerable amount of breaking down and plasticizing. It also requires the admixture of pigments, fillers, plasticizers, vulcanizers, and other ingredients.

This work is commonly done on what is known as a rubber mill, which consists of a pair of heavy rolls commonly placed in a horizontal plane with a narrow space or "bite" between the rolls, through which the rubber is fed by the rotation of the rolls. This process has been in use for many years. During the operation of the mill the rubber collects in a bank at the bite and, in its effort to pass through the bite, it rolls on itself, forming a rolling bank of rubber, this action in combination with the passage of the rubber through the bite thoroughly warming, softening, and kneading the rubber to reduce it to the plastic condition suitable for the subsequent operations.

During the process, the rubber forms in a sheet on the work roll of the mill, which is usually the roll which is driven at a relatively slow speed in contrast with the speed of the other roll, which is known as the feed roll. As the rubber forms into a sheet the operator will cut the rubber from the roll, usually in a long spiral, and by hand roll the rubber upon itself on the roll in a long mass or coil which he then passes into the bite of the mill. The cutting and rolling of the stock aids in the plasticizing operation and while devices have been created for doing this work automatically they have not replaced the old hand cutting and rolling operations which still prevail in most of the rubber factories.

The milling operation consumes a great deal of power, and heavy motors and gearing are required to drive the mill rolls but the speed of the rolls is usually maintained at about 60 lineal feet per minute because a mill operator cannot safely work on a mill which is running at a higher speed than that indicated because of the danger of being caught in the rubber and dragged into the mill.

The preparation of the rubber often requires several distinct milling or plasticizing operations, by which the rubber is first broken down and plasticized, and then blended with other rubbers and mixed with the various compounding ingredients.

All of the above considerations have kept the art of milling rubber in a comparatively crude state. Other operations in a rubber factory have been improved, speeded up, and made more or less automatic, but the milling of rubber is still in about the condition in which it was at the beginning of this art.

It is the purpose of the present invention to improve upon the art of milling rubber with the object of making the process as nearly automatic as practicable. With the machine of the present invention it is possible to dispense with manually cutting and rolling the rubber, the rubber in the improved machine being repeatedly cut and rolled or coiled upon itself while it is on the mill. This operation causes the rubber to pass from the several cutting points into the bank at the bite of the mill at an angle to the rolling bank located in the bite. This gives the rubber a thorough working and simulates the manual cutting and rolling of the rubber. It is repeated as many times as may be found desirable and, as the cutting and rolling is automatically done, the results are more uniform than in the old process.

Another feature of the invention is that while the rubber is being worked it progresses along the mill and may be removed at the end or ends thereof as a thoroughly plasticized ribbon or strip. This feature makes it possible on a long mill roll to have the rubber fed at a midway point on the mill and progress to opposite ends of the mill so that the two strips of rubber may be removed simultaneously. As a further advantage, it is possible to process two different stocks on the same mill, one stock being removed at each end of the mill.

It is a further object of the invention to provide a single machine in which the rubber may be prepared and thus to dispense with separate operations of plasticizing, blending and mixing.

It is a further object of the invention to devise a mill which can be operated at much higher speeds than is possible with the old types of mills. As indicated above, the milling process is a slow and laborious operation and it is one of the main advantages of the present invention that the speed of the mill rolls may be doubled or trebled, making for better and more economical milling operation.

While the machine shown and described herein may be used with crude rubber in sheet or slab form, it is the intention to adapt the mill for working on so-called "pelletized" rubber. In more modern operations, the crude rubber is supplied to the mills in relatively small particles or pellets and this form of rubber is particularly well adapted for use on the machine disclosed herein.

A further feature of the invention is the provision of a casement or housing surrounding a portion of the work roll which is adjustable toward and from the surface of the work roll and this adjustment may be made while the mill is operating. By passing the rubber between the work roll and the casing, the amount of work done on the rubber may be increased, thus enabling the rubber to be plasticized in less time than in the ordinary mill. Casings have been used for this purpose around the threaded screws of plasticizers and tubing machines for aiding in the plasticization of rubber, but the spaces have been fixed. By varying the space between the work roll and the casing, the amount of working can be accurately determined in accordance with the requirements of the stock. By providing means for adjusting the distance between the casement and the roll during operation of the mill, the distance may be changed immediately should the stock show evidence of excessive heating.

The casing may be used along the whole of the work roll or it may be confined to the area where the rubber is first introduced into the machine. This is particularly desirable in dealing with pellets of rubber where it is necessary to confine the rubber about the work roll until it has been mashed and kneaded together so that it will cohere in sheet form; thereafter, the casing may be dispensed with.

In some aspects of the invention the casement may not be required at all and the invention is not limited to the use of a casement about the work roll in combination with the other features of the invention.

The cutting of the rubber into strips on the work roll and the subsequent rolling of the strips upon themselves may be done as often as desired during the progression of the rubber along the mill. The cutting is done by knives which are followed up by plows or vanes, which turn the rubber upon itself and the number of knives, their spacing, and the angles of the vanes may be varied to suit the requirements of the stock.

For speeding up the mill rolls it may be desirable to reduce the width of the bite so that a thinner sheet of rubber will be formed on the work roll. The combination of the cutting and turning instrumentalities with the casing secures the requisite working at high speeds, without danger of scorching the stock.

It will be seen from the foregoing, and the description of the invention to follow, that the object of automatic milling of rubber or similar plastic materials has been obtained by a new and novel combination of elements used in conjunction with two mill rolls which are of standard design. The machine is highly flexible, so that it may be adapted to all types of rubber stocks or to other plastic materials. The operation of milling is much faster and safer than is possible with existing machines. In addition, and as a very important advantage, the process of milling may be controlled and the results will be more uniform than in the past where the workman has almost complete control over the amount of milling. By eliminating this human factor, the milling of rubber or other stocks may be brought to predetermined and exact results.

Other advantages will appear as the invention is more fully described. It will be understood that while the invention has been shown in great detail and while a number of modifications are shown, the invention is not limited or restricted to such details or modifications and may be further modified or improved upon within the scope thereof as set forth in the appended claims.

In the drawings, the best known and preferred forms of the invention are shown, in order that the principle of the invention may be practiced.

Fig. 3a is a section on the line 3a—3a of Fig. 3.

Fig. 4a is a view looking at the rear or rubber contacting side of a blade or plow.

Fig. 4b is a section on the line 4b—4b of Fig. 4a.

Figure 3:
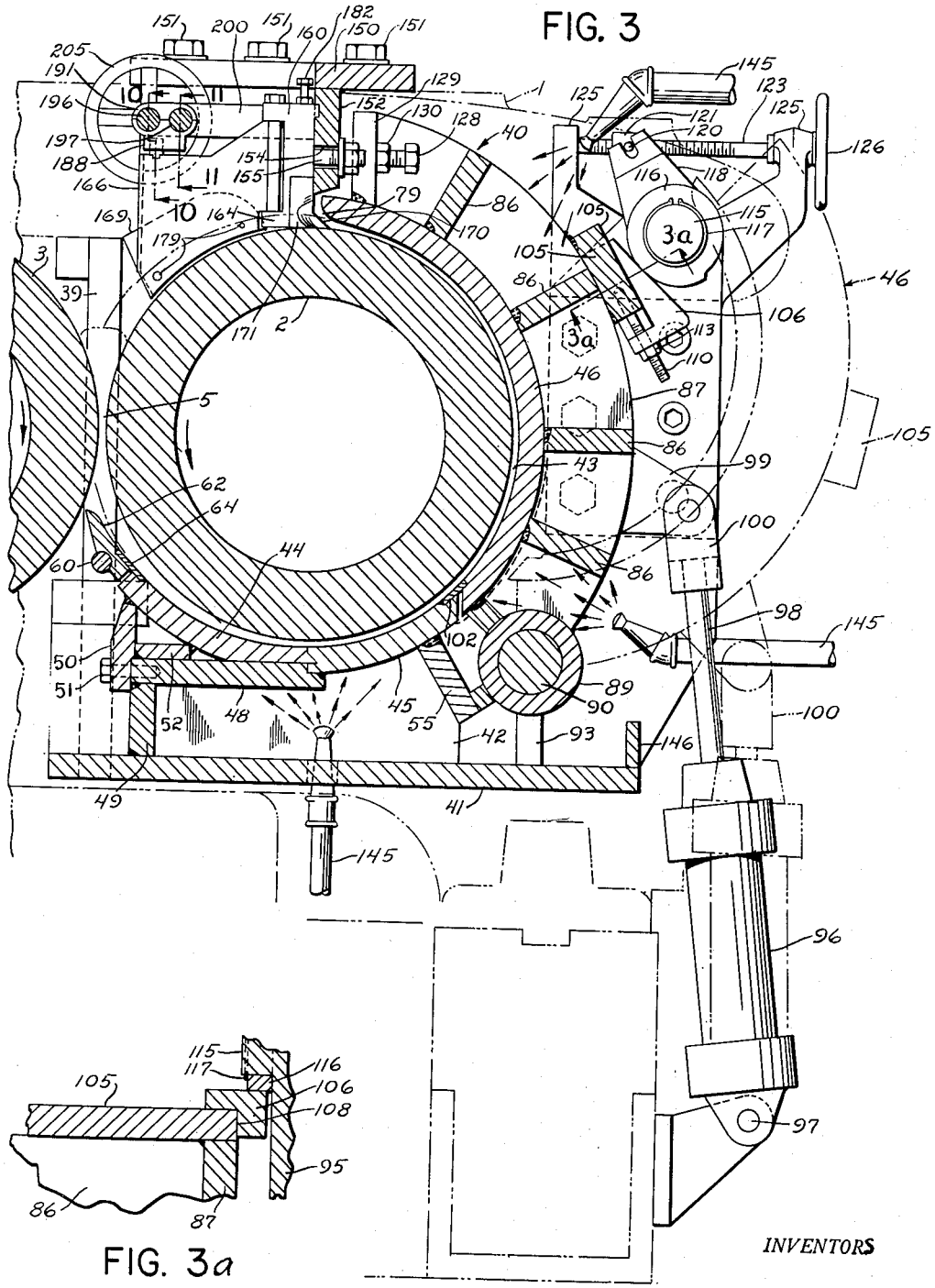
Fig. 3 is a vertical section of the machine on the line 3—3 of Fig. 1.
Figure 10:
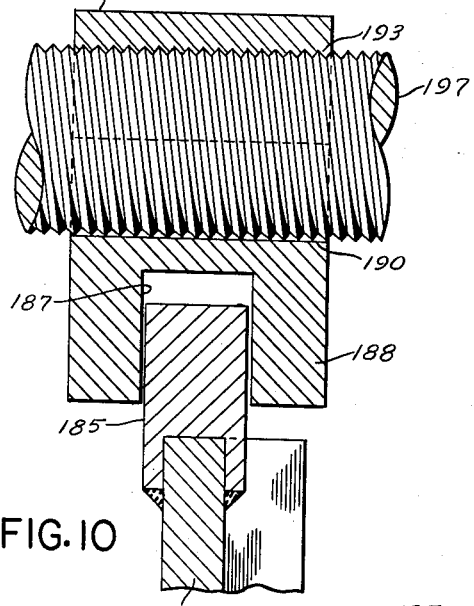
Figure 11:
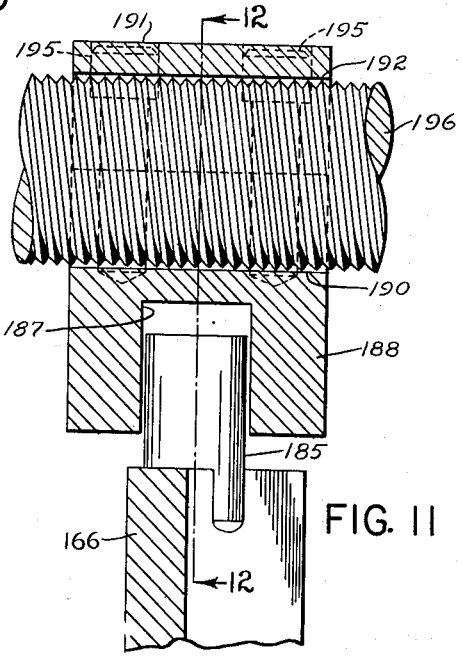

Figs. 10 and 11 are enlarged details on the lines 10—10 and 11—11 of Fig. 3.

Figure 12:
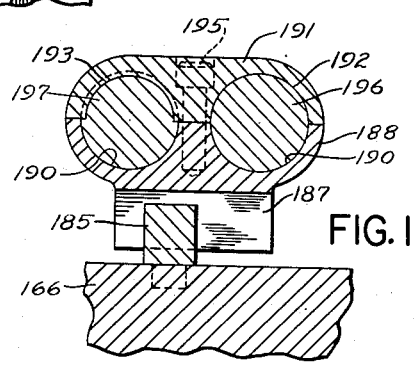

Fig. 12 is a section on the line 12—12 of Fig. 11.

Figure 13:
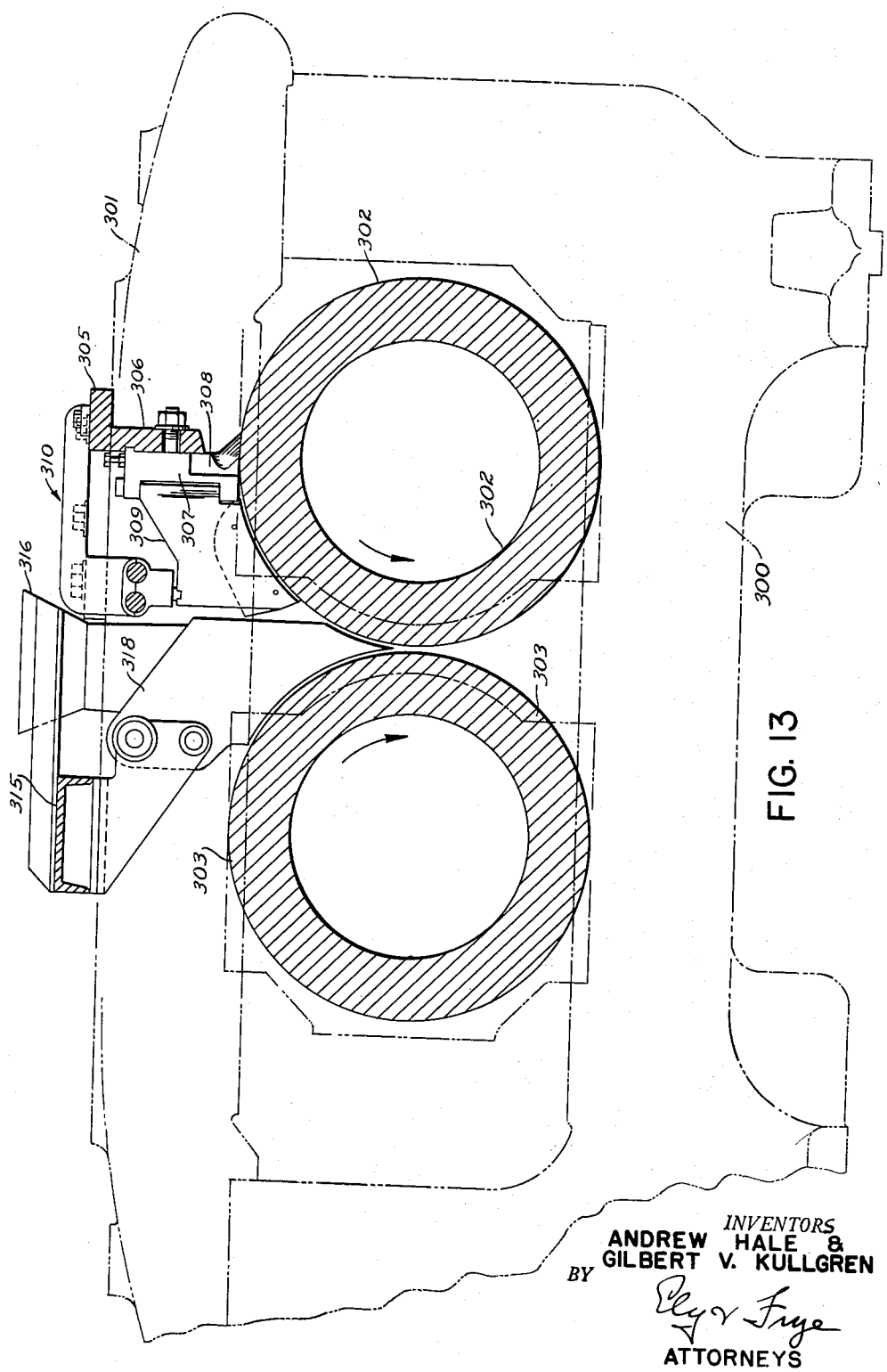

Fig. 13 is a cross section through a modified form of the machine in which the casement is absent.

Fig. 14 is a further modification of the machine with a different plow arrangement and with a modification of the casement.

Fig. 15 is a section on the line 15—15 of Fig. 14.

Fig. 16 is a view on the line 16—16 of Fig. 15 looking at the edge of the plow.

Referring particularly to Figs. 1 to 12, inclusive, there has been no attempt to show the frame of the mill except in a few of the views where it is indicated by the lines 1. The two mill rolls are mounted in the frame in the usual manner, the work roll being indicated by the numeral 2 and the feed roll by the numeral 3. These rolls are cored out or drilled and cooling water is passed into the rolls, as the rubber, due to the work which is put into it, gets very hot and the rolls must be cooled. The rolls may also be adjustable toward and from each other to vary the width of the bite, as is common practice and the means for which is not shown.

The rolls run in the direction of the arrows placed upon them in several of the views and the bite which is created at the point where the rolls are closest together is indicated by the numeral 5. It is this bite through which the rubber must pass and it is at this point that it collects in the rolling bank, indicated by the dotted lines in Fig. 3, where the rubber turns and rolls over and over upon itself in its effort to pass through the bite. It is due largely to the maintenance of a rolling bank that the rubber gets most of its kneading and rolling, a rolling bank being recognized as extremely useful in obtaining effective plasticizing of the rubber.

The roll 2 is usually driven at a slower speed than the roll 3 and the sheet of rubber which has passed through the bank, as indicated by the dotted lines in Fig. 3, will cling to the roll 2 and pass into the casement which surrounds that roll, as will be described. The two rolls are driven in the manner common to mills by the gearing indicated on Fig. 1, power being derived from the motor driven pinion 8, which drives a large gear 9 on roll 2 and then, through the gears 11 and 12, drives the feed roll 3.

Across the mill and bolted to the frame is a heavy beam 15, to the upper surface of which are fastened by bolts 17 the two parallel angle irons 16 which project over the bite 5 and to which the feed chute or hopper 18 is secured. This feed hopper is used primarily when the mill is operating upon pelletized rubber, which is fed in a measured stream through the hopper into the space between the two mill rolls. Where sheet or slab rubber is used, the hopper may be removed and the rubber fed by hand; however, it is preferred to use the hopper feed and rubber pellets as the flow of rubber into the mill may be accurately regulated by any well known forms of flow measuring and metering devices.

Figure 1:
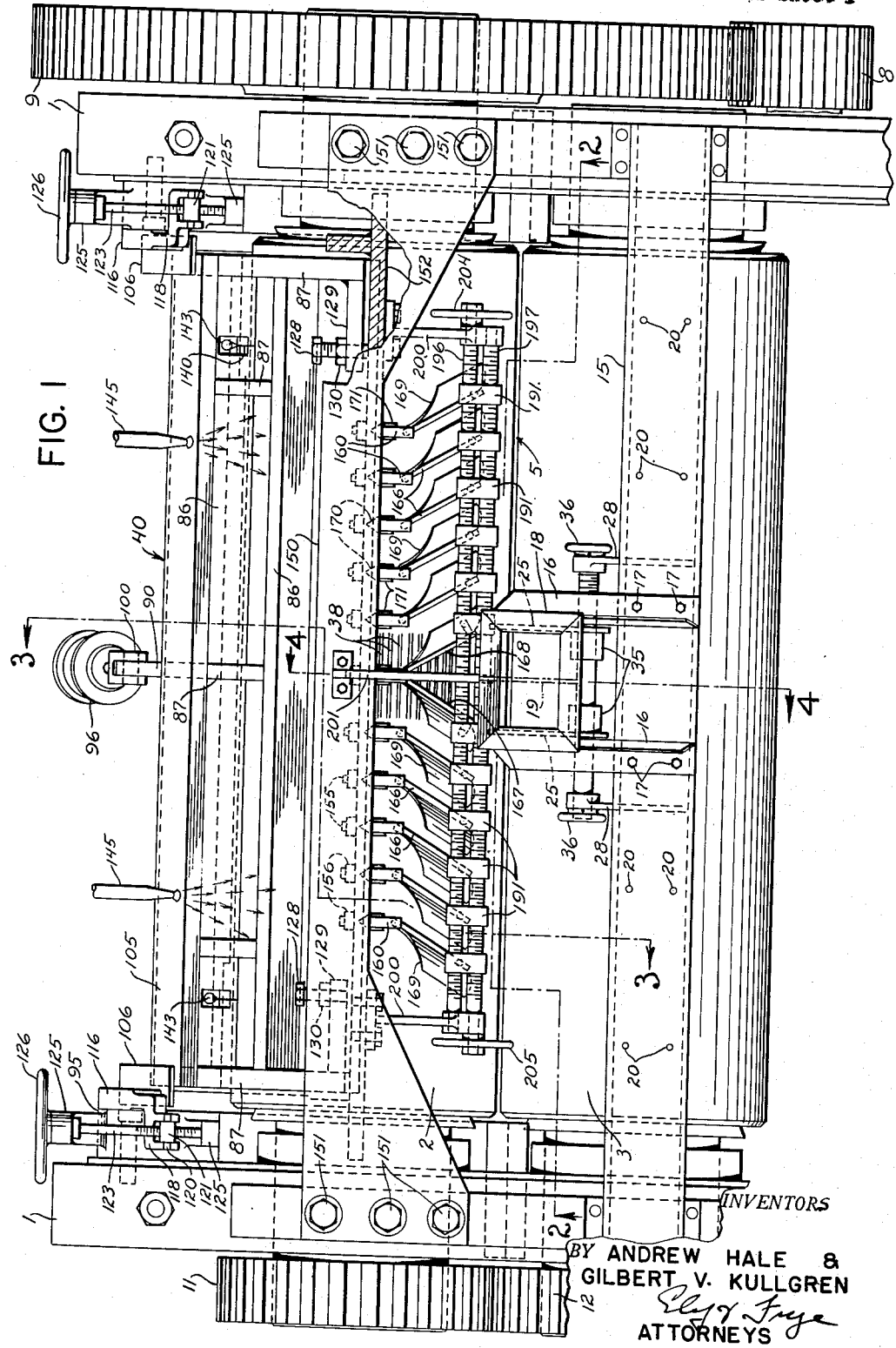
Fig. 1 is a plan view of a mill equipped with various features of the invention.

In Fig. 1, the hopper is shown in full lines at the center line of the mill and in this view the vanes or plows are shown in full lines as positioned in oppositely directed angles from the center of the mill. This arrangement is that which is used when the mill is delivering milled rubber at both ends of the mill. In such a case it may be desirable to divide the hopper by a vertical partition shown in dotted lines at 19 in Figs. 1 and 4, by which two different stocks may be fed to the one mill, each stock progressing to opposite ends of the mill.

It is possible to adjust all the vanes in the same direction so that the fresh stock will be fed at one end of the mill and the plasticized rubber taken off at the other end. In this case, the hopper will be located at one end or the other of the mill and this has been indicated by showing the sets of bolt holes 20 at either end of the beam 15, indicating the alternative location for the hopper.

To prevent the pellets of rubber from falling to one side or the other of the zone in which they are fed, and thus to insure that they pass through the desired point on the bite in the first pass, side boards 25 are provided at either side of the hopper. These side boards are formed with long, depending portions 26 which pass down in close proximity to the bite 5. The side boards are carried on brackets 28 supported by bolts 29 from plates 30 welded to the underside of the beam 15 and are shiftable with the hopper to either end of the mill.

The side boards are carried on the brackets 28 by a horizontal upper shaft 32 and a parallel lower shaft 33. Each shaft is preferably threaded to engage a threaded bushing 35 on one side board and the shafts may be rotated by hand wheels 36 to shift the side boards toward and from one another and adjust the space occupied by the pellets or by the unmilled stock.

Figure 2:
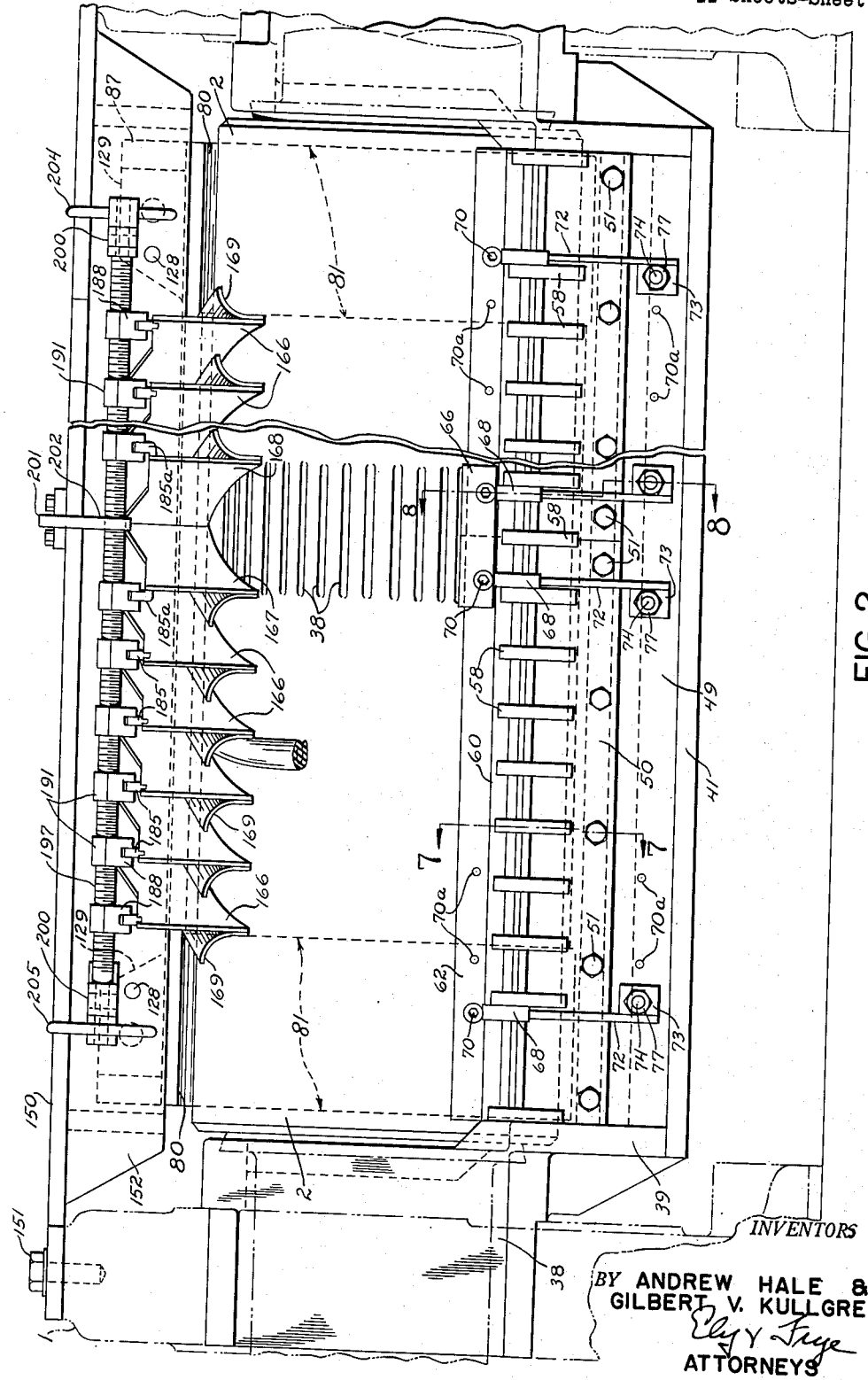
Fig. 2 is an elevation looking at the face of the work roll, the location of this view being indicated by the line 2—2 of Fig. 1 and also by the line 2—2 of Fig. 4.

Pellets of rubber, as they are fed to the machine, are usually cold and coated with soapstone or the like to prevent them from adhering together. It is, therefore, difficult to get these pellets to enter into the bite and also difficult to mat them together in one pass through the bite. To assist in the effective use of the mill, it may be desirable to provide the work roll 2 with grooves in the area where the pellets enter the machine. In Fig. 2, the work roll is shown with numerous grooves 38 cut or ground in its surface at the hopper area. These grooves fade out at either end so that the balance of the roll is smooth. The provision of these grooves is optional and is necessary only where the machine is used for pellet rubber, and then only if the pellets show a tendency to refuse to pass readily into the bite.

Surrounding the work roll 2 is the housing or casement to which reference has been made. This casement is indicated as a whole by the numeral 40. It extends from a point below the bite 5 to a point at or adjacent to the top of the roll 2. The casement is carried on a bed plate 41 mounted in the mill, on which, at spaced points, are the vertical supporting webs 42. The bed plate is held in the frame of the mill by two hangers 39 welded to the bed plate and mounted between the upper and lower members of the housing 1.

The casement is formed of a front or lead-in section 44, a short, intermediate section 45, and a longer, swinging section 46.

The section 44 is formed on an arc which diverges from the surface of the roll 2 to form a throat which gradually narrows to a point the required distance from the roll to form a working space 43 between the roll 2 and the casement. The throat facilitates the entrance of the rubber into the narrow working space between the roll 2 and the casement. The section 44 is supported on a plate 48 set in the top of the webs 42 and held by a cross piece 49. The outer edge of the section 44 is supported by a vertical cross piece 50, secured by bolts 51 to the cross piece 49, and welded to the section 44 and to a supplemental plate 52.

The section 45 is a continuation of the section 44, but its face is concentric with the face of the roll 2 but at a fixed distance therefrom. It is supported by a tongue and groove connection with section 44 as shown in the several views and by a cross piece 55.

Welded to the upper portion of the cross piece 50, at spaced intervals, are a plurality of parallel vertical blocks 58 (Fig. 7), the upper edges of which are recessed as shown at 59 to receive a long shaft 60 which is welded in position therein. About this shaft is rotatable a long bar 62, the upper edge of which is close to the feed roll 3 and constitutes the beginning of the throat leading to the space between the plate 44 and the roll 2. This bar will catch any pellets or particles of rubber which may fall through the bite and conduct them to the space between the casement and the roll 2. A shim of spring steel 64 is welded to the bar 62 and rests in a rabbet cut in the edge of the section 44 to bridge the gap between the parts 44 and 62.

The bar 62 also carries a scraper blade 66 which bears against the surface of the roll 3 to remove any particles of rubber which adhere to the feed roll 3. As the tendency of any rubber to cling to the roll 3 is present only when the rubber is in pellet form or is first introduced into the mill, the scraper is confined to that portion of the mill where the hopper is located. The scraper blade is held on the bar 62 by two clamping blocks 68 which, with the bar 62, surround the shaft 60 and rotate thereon. The blocks 68 are secured to the bar by bolts 69 and 70, the latter also passing through the blade. If the hopper is shifted to one end or the other of the mill, the scraper blade is also shifter, as indicated by the supplemental holes 70a on Fig. 2. To support the bar 62 at its far ends, supplemental blocks 68a, similar to the blocks 68, are located near the ends of the bar 62.

Figure 8:
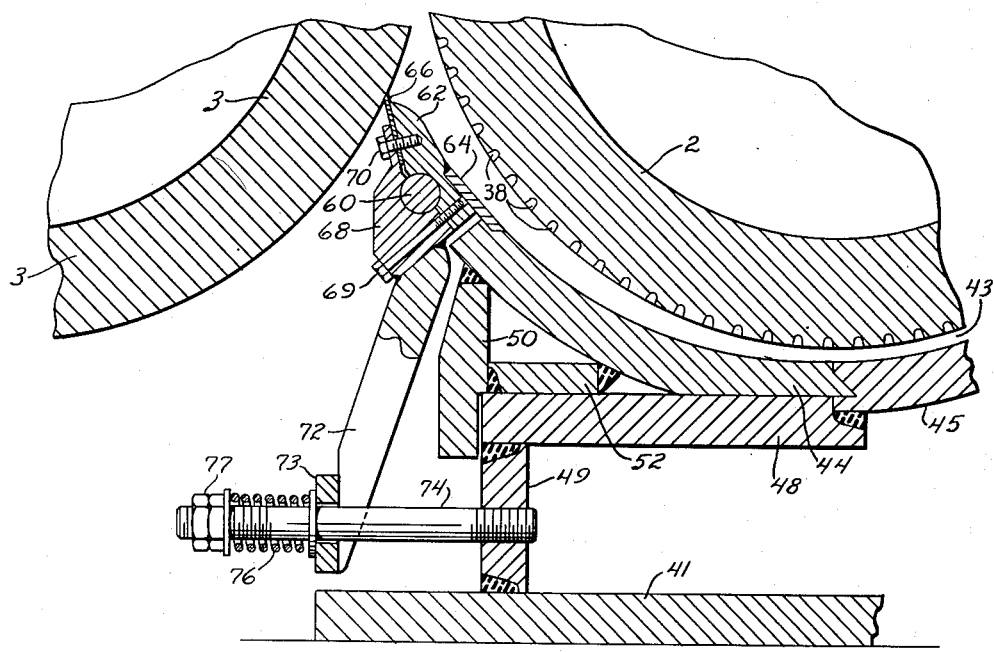
Fig. 8 is a detail on the line 8—8 of Fig. 2 showing the scraper which may be used in conjunction with the feed roll.

It is desirable to hold the scraper blade against the roll 3 by yielding spring pressure. For this purpose each of the blocks 68 is welded to a lever arm 72, the lower end of which is provided with a cross plate 73, through which is passed a long rod 74, the inner end of which is threaded into the cross piece 49 (Fig. 8). Around the outer end of the rod 74 is a coil spring 76 held under compression against the plate 73 by nuts 77. This gives the requisite yielding spring pressure to the scraper blade 66.

The swinging and adjustable section of the casement has been given the reference numeral 46. It is a heavy arc-shaped plate which extends from the edge of the short section 45 to a point near the top of the work roll 2, where it is flared as shown in the various views to form a discharge outlet 79. The curvature of this plate is concentric to the roll but is spaced therefrom to provide a working space between the roll and the plate. The spacing is determined by the character of the stock and the swinging section is arranged so that at its extreme innermost position the depth of this space will be uniform about the roll. However, as has been stated, this section of the casing may be set to diverge from its lowermost point to the delivery edge thereof at the top of the roll.

Figure 4:
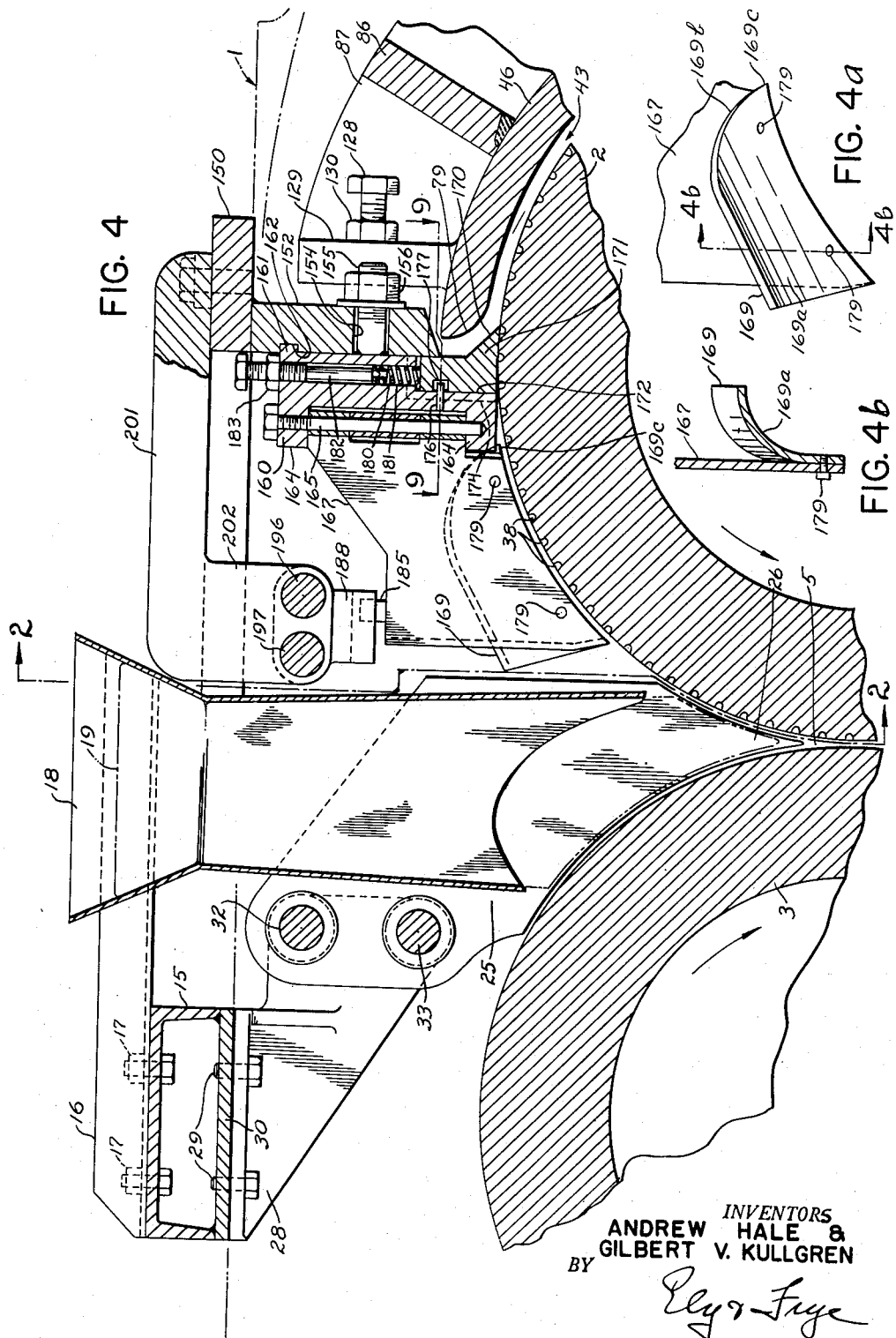
Fig. 4 is an enlarged vertical section through the hopper, through which the rubber, usually in pellet form, is fed to the machine. This view also shows the details of the knives and the plows or vanes which turn the strips of rubber upon themselves before they re-enter the bite.
Figure 5:
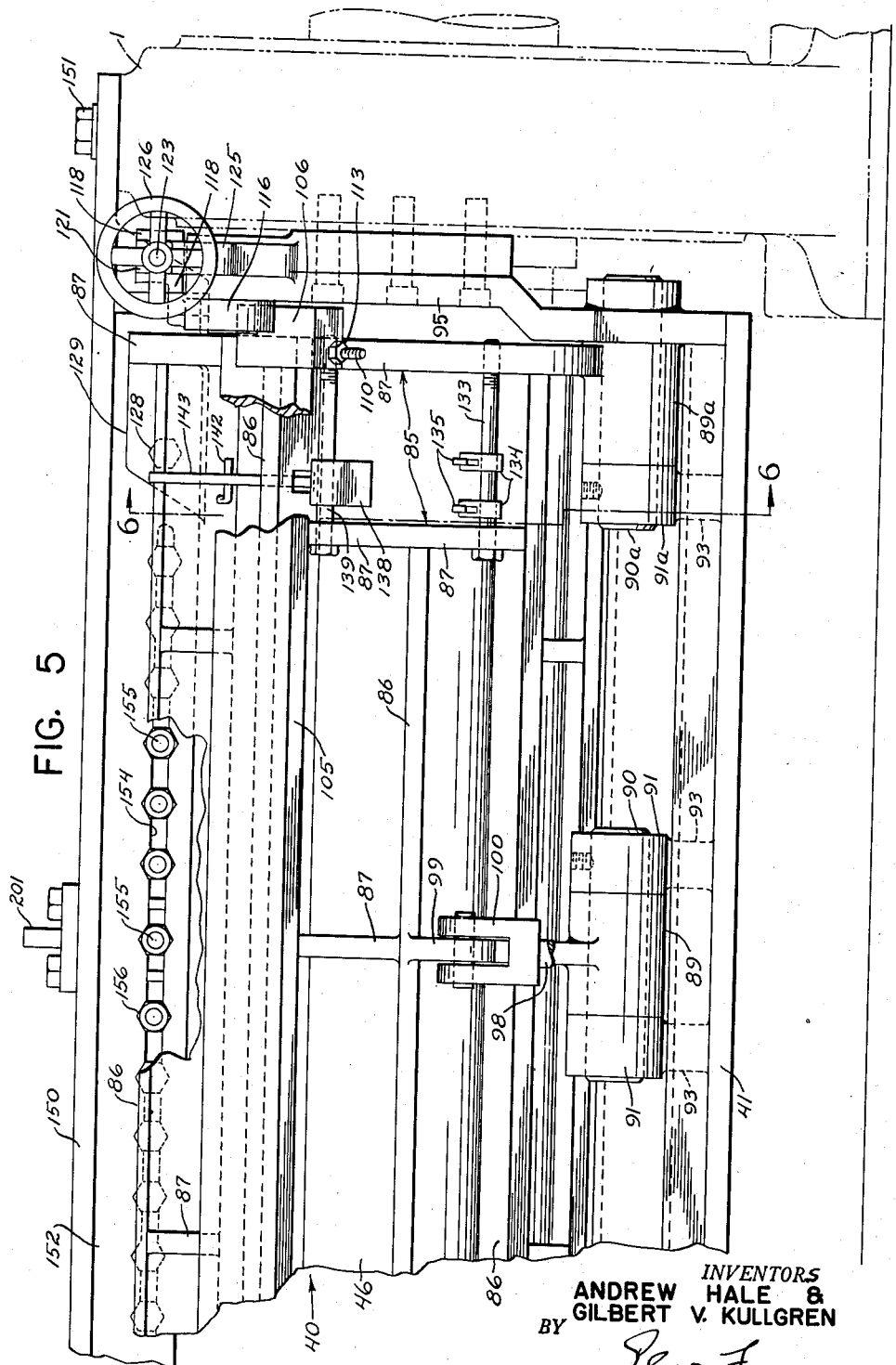
Fig. 5 is a rear elevation of the machine.
Figure 6:
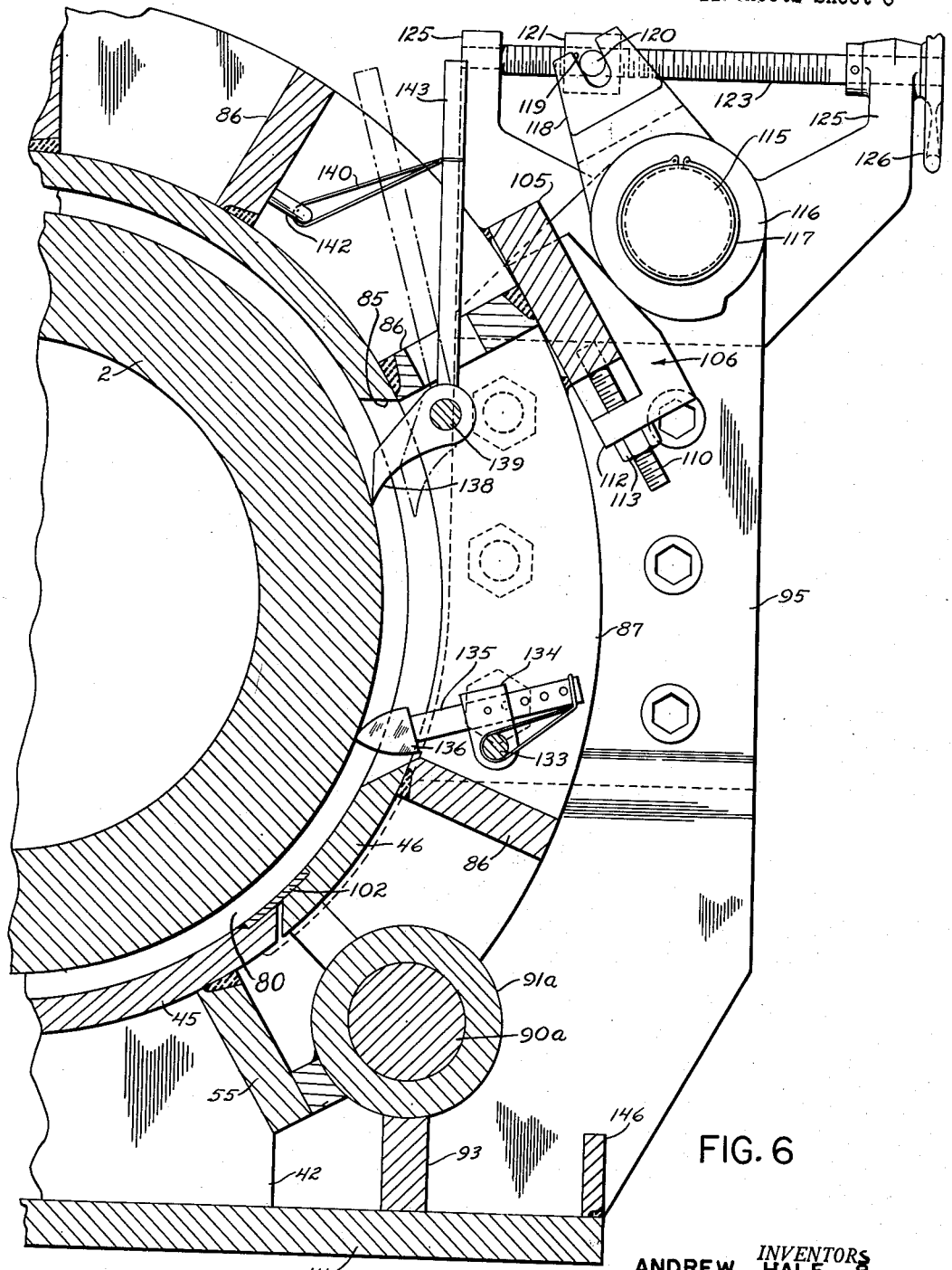
Fig. 6 is a section on the line 6—6 of Fig. 5 showing the means for removing a strip of milled rubber from one end of the mill.
Figure 7:
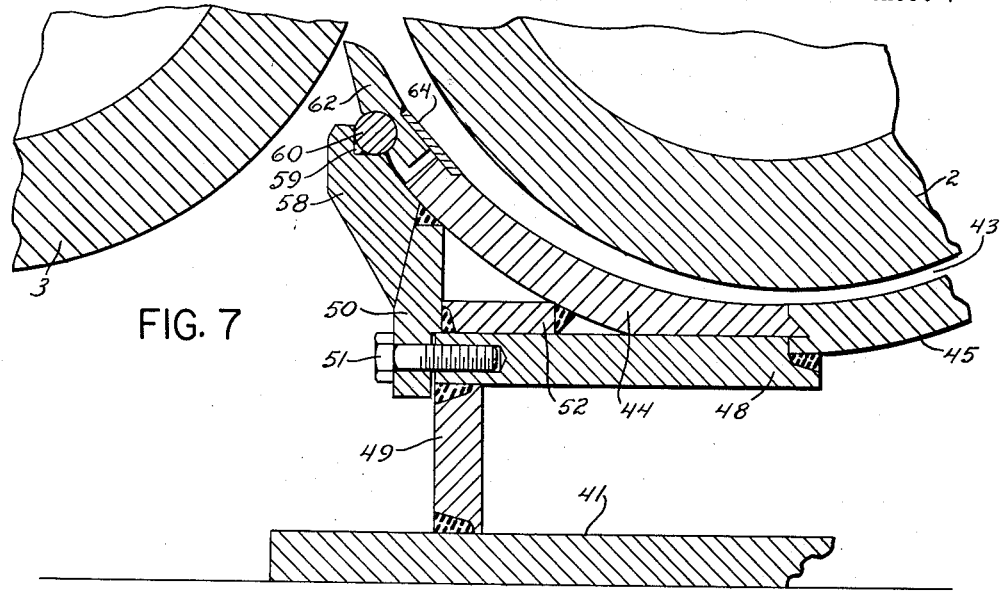
Fig. 7 is a detail of the casing just below the bite of the rolls, the location of this view being indicated by the line 7—7 of Fig. 2.

In the form of the invention shown in Figs. 1 to 12, this section of the casement extends along the entire extent of the roll 2, but at the ends thereof it is relieved as shown at 80 in Figs. 2 and 6 to form spaces of greater depth than working space 43 to provide areas at the ends of the roll where the milled rubber is removed. This relief area is shown by the dotted lines 81 in Fig. 2. The supplementary sections of the casing 44 and 45 are likewise relieved in these areas, as is shown by comparing the depths of the space between the roll 2 and the casement as shown in Figs. 6 and 7. In each of these areas 81 the casement section 46 is provided with a large opening or gate 85 shown in Figs. 5 and 6 for the removal of the milled rubber, as will be described.

Because of the heavy work which is exerted upon the stock between the roll 2 and the casement, this swinging section is reinforced on its outer face with heavy longitudinal beams 86 welded at spaced points to the back of the section and circumferential ribs 87.

At spaced points along the swinging casement section 46 are located heavy bearing sleeves 89 and 89a. The bearing sleeve 89 at the center line of the casing is journaled on a shaft 90 which is mounted in two bearings 91, which are located on posts 93 rising from the bed plate 41. The shafts 90a for the bearing sleeves 89a at the ends of the casing section 46 are mounted in bearings 91a and in bearings formed in stanchions 95 rising from the ends of the bed plate 41 and secured to the frame of the mill, as shown in Fig. 5.

The casing section 46 is held in its raised position and is rocked to and from the roll 2 for the purpose of getting at the space 43 for cleaning by means of a hydraulic ram 96 pivoted to the frame of the machine at 97. The piston 98 of the ram is forked at 100 and pivoted to a lug 99 formed as a part of the central circumferential reinforcing rib 87. When the pivoted casement section is swung away from the roll 2, it occupies the position shown in dotted lines in Fig. 3. A flexible shim 102 similar to shim 64 is welded at one edge to the fixed casing section 45 and is received in a rabbet in the lower inside edge of the movable casing section to bridge the gap between these two sections. This shim is wide enough to allow sufficient overlap to cover the gap in any position of working adjustment of the movable section.

The innermost position of the swinging section 46 may be its permanent working position and any suitable means would then be provided for holding it in that position. However, it is desirable, in the preferred form of the invention, to provide means for varying the space 43 between the swinging casement section and the roll 2. This is for the purpose of easing or increasing the working stresses put upon the stock while passing through the space 43 at the swinging section. With certain stocks, it may be desirable to utilize the space 43 at its minimum depth throughout; with other stocks it may be found desirable to open up the space 43 and thus relieve, to a predetermined degree, the stresses upon the rubber. It may also be desirable to make such an adjustment of the working space 43 while the machine is in operation. Rise in temperature of the stock, which would be reflected in power consumed to drive the machine, would indicate the necessity for increasing the space; drop in the temperature of the stock and decrease in the load upon the driving means would indicate the necessity for reducing the space 43 and thus increasing the input of work into the stock. For these reasons the adjustable holding means for the movable casement section has been devised, as will now be described, and is the preferred construction of the machine.

Along the casing section 46, near its upper end, is welded a heavy steel beam 105 and overlying the ends of the beam are two heavy steel bearing blocks 106 which extend beyond the casing at each end thereof. The upper side of each bearing block is provided with a tapered or wedge-shaped surface. This block is extended inwardly so that an extensive vertical face thereof rests against the end of the beam 105 and is braced thereby. The block is shown as adjustable across the face of the beam by a threaded rod 110 set in the beam and passing through an inwardly extending lug 112 on the block, a nut 113 holding the block in its adjusted position. It may, however, be fastened to the beam 105 without any provision for adjustment.

Located at the top of each stanchion 95 is a heavy shaft 115 on the projecting end of which is mounted a rotary cam 116 held in place by a locking ring 117. As shown in Fig. 6, this cam has an eccentric surface which bears against the wedge-like surface of that portion of the bearing block which projects over the side of the casing.

For ordinary adjustments of the space 43 the cam 116 is rotated by means of an offset arm 118, which is bifurcated and provided with opposed slots 119 which receive pins 120 extending from either side of a nut 121. To obtain additional adjustment the blocks 106 are shifted over the beam 105. The cam is rocked on its bearing by means of a threaded shaft 123 engaging the nut 121. The shaft 123 is rotatable in arms 125 formed on the upper end of the stanchion 95 and is actuated by a hand wheel 126.

The extent of inward movement of the casing section 46 is determined by means of two set screws 128 which are threaded into brackets 129 located near the discharge point of the casing and welded to the casing and to the outside ribs 87. The ends of the screws 128 bear against the cross beam which supports the knives and plows, as will be described. Lock nuts 130 hold the set screws in position.

The cams 116 and their actuating means are located in the stanchions at the sides of the casing and hence do not interfere with the outward swinging of the casement by the operation of the ram 96. It is necessary, however, to remove the bearing blocks 106 before the swinging casement section can be fully opened.

It will be seen that the space 43 may be adjusted to vary the stresses placed upon the stock by operation of the hand wheels 126 and this may be done without interrupting the operation of the mill. From the fact that the amount of work exerted upon the stock while passing through the space 43 is reflected in the power input to drive the rolls, it is evident that an automatic adjusting means for varying this space may be made responsive to the load and the space can be varied automatically by motor means controlled by the fluctuations of power to the rolls.

The adjustment means for varying the space between the movable casement or casement section and the work roll as shown herein is one of many which might be devised for the purpose.

Reference has been made to the openings 85 in the casement, through which the milled stock is removed in the areas 81 at the ends of the roll. Referring particularly to Figs. 5 and 6, it will be seen that across each opening or gate 85 and set in adjacent reinforcing ribs is a shaft 133 on which are mounted spaced rotatable knife holding blocks 134, in which are located knife bars 135, the inner ends of which are provided with slitting knives 136. These knives will cut a ribbon of rubber from the work roll, which is removed through the openings 85. In order to remove the strip of rubber from the roll, a spade-shaped stripper block 138 is located above each pair of knives. Each stripper is rotatably mounted on a shaft 139, similar to the shaft 133. To prevent the stripper from digging into the surface of the roll, a tie member 140 is looped over a pin 142 on a beam 86 and passes over a shaft 143 set in the block and extending through an opening in the adjacent reinforcing beam.

The working of the rubber between the roll 2 and the casement creates a great amount of heat and to remove this heat the casement is cooled by any suitable means. As shown in the drawings, this may be done by a plurality of cooling sprays 145 which are directed against the rear wall of the casing, the water which runs down off the casement being collected in the pen formed by the bed plate 41 and a surrounding wall 146.

Figure 9:
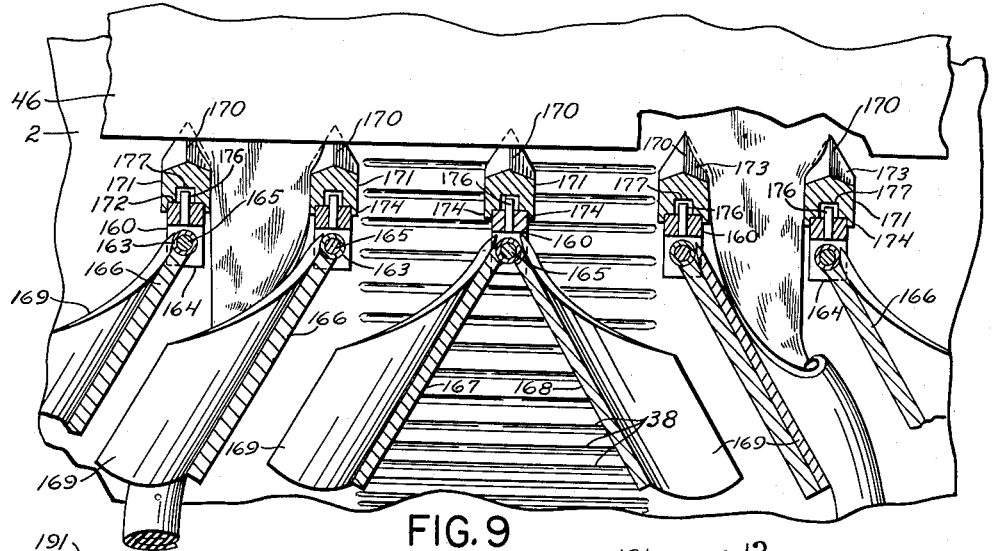
Fig. 9 is an enlarged, sectional detail of the knife and plow units on the line 9—9 of Fig. 4.

As the rubber issues out of the opening 79 between the casing and the roll 2 in sheet form, it is cut into strips which are turned over in the manner described. The rolls or coils thus formed are shown in Figs. 2 and 9. The means for performing this work on the rubber is mounted on a beam 150 which is in the form shown in Fig. 1 having widened ends which are attached to the frame 1 by the bolts 151. The central portion of the beam is reduced in width and to this portion of the beam is welded a vertical plate 152 which supports the knives and the vanes or plows.

The number of knives and plows or vanes may be varied to cut more or less strips or strips of varying widths. These factors will be determined by the character of the stock, some stocks requiring many cuttings to work them properly and others requiring relatively few cuttings. For this reason, the plate 152 is provided with long slots 154 which extend from one end of the working surface of the roll to the other. The several knife and plow units are mounted at the desired places along the plate 152 by bolts 155 extending through the slots and held by the nuts 156.

The several knife and plow or vane units are alike except where the vanes are placed in diverging groups where a double V-shaped vane is employed at the center of the mill. Referring to Fig. 4, each unit comprises a block 160, the rear face of which is held onto the front face of the plate 152 by the bolts 155. Along its rear upper edge, the block is provided with a rib 161 which seats in a groove 162 cut in the face of the plate 152. The front edge of the block is provided with two spaced wings or lugs 164 in which is located a long bearing pin 165 on which the vane is pivotally mounted. Each vane is provided with a sleeve 163 along its inner edge to be received over its bearing pin. The single vanes carry the reference numeral 166. The double vane at the center of the machine is given the numerals 167—168. In this case the two wings 167 and 168 are mounted upon the pin 165 by making their bearing sleeves in a form resembling a door hinge mounting shown in Fig. 4, so that each vane of the center unit may move about the pin 165 with its group of vanes when the vanes are angularly adjusted with respect to the roll 2.

The detailed construction of the vanes is similar and is shown more particularly in Figs. 4a and 4b. Each vane extends for some distance around the roll 2 but terminates at a considerable distance above the bite and above the bank of rubber in the bite. This is so that as the coil of rubber meets the bank of rubber churning about in the bite it may pass to either side and thus the rubber coming from the vanes will be distributed along the bite. This all makes for better blending and milling of the stock.

The lower edge of each vane follows closely the curvature of the roll 2 and on the rear side of each vane, or that side against which the oncoming stock is carried by the rotation of the roll 2, is secured a curved plow or shoe 169. This shoe may be welded to the vane proper or it may be held by set screws 170 passing through the vane and entering the lower edge of the shoe. The shoe has a curved lower edge which follows the curvature of the roll 2 and upwardly extending curved portion 169a, which overcharges the roll 2 and gives the rolling action to the rubber strips which causes them to assume the coil form shown in the drawings. At its leading end the shoe is cut along the curved line 169b, which brings the end of the shoe to a point 169c, which is set as close as possible to the knife block 171, so as to intercept the turned-up edge of the rubber strip as it passes off the knife block.

The rubber is cut into the strips which are fed to the vanes and the shoes thereon by means of knives 170, one of which is located in each block 160 to the rear of the vane. As shown in Fig. 9, each knife is ground with a sharpened tapering cutting edge which is located directly in front of the delivery point 79 and preferably underlying the upper edge of the casing section 46. The inclined surfaces 173, at the front of the knife as shown in Fig. 9, will lift the edges of the strips and initiate the turning or rolling movement. Each knife is part of a knife block 171, the upper portion of which is received between a cutaway face 172 of the block 160 and the lower edge of the plate 152. The face of the knife block adjacent the face 172 is formed with two flanges 174 which guide the knife block in its vertical movement and a pin 176, set in the block 160 and riding in a slot 177 in the knife block, limits the extent of that movement.

Each knife is pressed against the surface of the roll 2 by a coil spring 180 housed in a bore 181 formed in the block 160 above the knife. A pressure regulating pin 182, threaded in the upper end of the bore and held by a lock nut 183, bears against the spring and regulates the degree of pressure forcing the knives into the oncoming sheet of rubber and against the surface of the roll 2.

On the upper outer corner of each vane is welded a pin 185, those on the vanes 166 being split and straddling the vane, as shown in Figs. 10 and 11, while the pins 185a on the vanes 167 and 168 are angularly formed as shown in Fig. 2. Each pin 185 or 185a is received and guided in a slot 187 cut in the under face of a special form of half nut 188, shown in detail in Fig. 12. The upper side of the half nut is provided with two smooth parallel grooves 190. Over the half nut 190 is placed a second reversely turned half nut 191, provided with grooves 192 and 193 which are complementary to the grooves 190, with the difference that one of the grooves, here shown as 193, is threaded. The two half nut sections are clamped together by countersunk bolts 195.

The passages formed by the recesses in the opposing faces of the half nuts are occupied by threaded shafts bearing the reference numerals 196 and 197. It will be seen from Fig. 12 that the shaft 196 will turn idly in the seat formed by the surfaces 190 and 192 while the shaft 197 is threaded in the surface 193. Hence, when the shafts 196 and 197 are rotated the nut formed by the sections 188 and 191 will be moved by the shaft 197. In the arrangement provided for herein the blades 166 and the blade 167 on the left of the center line are all connected through the nuts 188—191 to the shaft 197, while the blade 168 and the blades 166 on the right side of the mill are all connected to the shaft 196. This is done by reversing the position of the half nut 191 for the two sets.

Referring to Figs. 1, 3, and 4, which show the manner of mounting the shafts 196 and 197: At each end of the plate 152 is secured a bracket 200, which extends outwardly to a position in line with the ends of the several vanes. At the center of the machine is a third bracket 201, which is bolted to the top of the beam 150 and is provided at its outer end with a depending arm 202. The two shafts 196 and 197 are rotatably mounted in aligned bearings provided for them in the brackets 200 and the arm 202. The shaft 196 is extended beyond the bracket 202 at the right hand side of the mill and to that end is secured the hand wheel 204. The shaft 197 is likewise extended to the left and to that shaft is attached the hand wheel 205.

In the selected arrangement shown in Fig. 1, all of the half nuts 191 to the left are threaded to the shaft 197 and all of the half nuts to the right are threaded to the shaft 196. Hence, by rotating the shaft 196 the vanes to the right may be moved to vary their regular position, but this will not affect the vanes to the left, while, when the shaft 197 is rotated, the vanes to the left will be moved but the vanes to the right will be stationary. The vanes in either set may be set at varying angles by shifting the half nuts on any vane along the shafts 196 and 197 before assembling the half nuts. In this manner the angular position of the vanes may be progressively increased or decreased in each set.

The purpose of adopting this method of moving the vanes will be apparent when the vanes are all to be set in the same direction to provide for feeding the stock to one end of the mill and passing it along the mill to the other end. In such a case, the vanes will all be turned in one direction and the half nuts 191 will also be set to engage one shaft 196 or 197 only. By rotating the engaged shaft the vanes will all be operated in unison, the half nut passing along the other shaft freely because the smooth surfaces 192 on all of the half nuts 191 will be over the other shaft.

Reviewing the operations of the machine as it is shown in Figs. 1 to 12, it will be seen that rubber, preferably in the form of pellets, is fed into the hopper 18 and falls into the bite of the rolls 2 and 3, between the side boards 25. The pellets are drawn into the bite, being assisted by the grooves 38 on the roll 2, if such means are provided. The action of the rolls tends to crush and mash the pellets together in the first stages of forming the sheet and the rubber then passes into the space 43 between the roll 2 and the casement, where it receives a further working, and passes out through the opening 79. After the mill has made a few rotations the exposed surface of roll 2 will be covered by a coherent sheet of rubber. As the sheet of rubber passes out through opening 79 it encounters the knives 170, which cut it into a plurality of strips. These strips then pass to the vanes and shoes 169, which turn each strip over and form it into a roll or coil which is drawn, by movement of the roll 2, endwise into the bite, where it joins and mingles with the bank of rubber at the bite.

The result is that the rubber is methodically cut into strips, rolled upon itself, passed into the bank between the rolls, thence back into the casing, but the mass of rubber is constantly progressing toward the end sections of the mill. At those points strips of thoroughly milled rubber are being removed continuously.

If the hopper is moved to either end of the mill and all the vanes set in one direction, the rubber will progress along the whole length of the mill. The angles of the vanes may be changed while the mill is in operation, but of course the determination of the number of knives and vanes should be made prior to starting the mill.

The casing section 46 will be set at the optimum spacing for the stock, but should it develop that the working of the rubber is too severe, the section 46 will be relieved by the cam adjustment and this adjustment may be so great that little or no work is done on the rubber at the section 46, At various points along the mill, additional ingredients may be introduced into the rubber. It is possible also to lift ribbons from various points and, by conducting them over guide rolls, return the strips to other points on the mill. This is a well known procedure in the art and illustration thereof is deemed unnecessary. Transfer of strips of rubber to various parts of the mill will assist in cooling the rubber.

In the modification shown in Fig. 13, the beneficial advantages of cutting the rubber into strips and turning the strips upon themselves, and advancing the stock along the mill are all secured without the use of a casing around the work roll. This view shows how the instrumentalities for cutting and turning the stock may be applied to a standard mill with the minimum of expense.

In this view, a standard mill housing and frame is indicated at 300, the upper cross members being given the numeral 301 and the mill rolls are designated by the numerals 302 and 303. In this case a beam 305 is secured to the member 301 to support the plate 306, to which are attached the blocks 307 corresponding to the blocks 160. The knives 308 and the adjustable pivoted blades 309 are the same as in the former views. The means for adjusting the angularity of the blades is given the general reference numeral 310.

The cross beam 315 is also attached to the member 301, from which are supported the hopper 316 and the adjustable side boards 318.

The operation of this form of the invention is the same except the rubber is not worked between the roll 302 and a casing. This may be all the working which is required by certain stocks.

In the form of the invention shown in Figs. 14 and 15, simplifications of the preferred form are shown and these may be adopted where the operations in the rubber factory are sufficiently large so that mills can be used advantageously for single stocks.

In this form of the invention the mill housings are indicated by the numeral 350 and the rolls by the numerals 352 and 353. The casement for the roll 352 is made of a fixed arcuate section 355 which is mounted by side plates 356 and a front plate 357 rising from bed plate 358, mounted on the lower part of the housing below the rolls. The scraper blade 360 for the roll 353 is adjustably mounted on the upper edge of the front plate 357.

The movable section of the casement, which is given the reference numeral 362 is welded to two large parallel U-shaped arms 364, which are pivoted on a horizontal shaft 365 extending across the mill and mounted in the side plate 356. Sprays 366 play upon the casement, the water being drained into a pan 367.

The arms 364 are arched and extend over the mill and their ends are welded to a cross plate 368, which is anchored by a bolt 369 to a second cross plate 370 mounted on the bed plate 358. The bolt 369 is passed through a slot 372 in the cross plate 368 and nuts 374 hold the arms in the proper position to obtain the desired space 375 between the roll 352 and the casement section 362. In this case the spacing 375 may be adjusted while the mill is in operation.

In this form of the invention the knives and vanes are consolidated so that each cutting and turning unit is in one piece. This is shown in the views by providing a plurality of plates 380, the lower edges of which are formed on an arc to follow the curvature of the roll 352. The vertical rear edges of the plates are sharpened to provide knife surfaces 381, which cut the rubber sheet, as it issues from the casement, into the plurality of strips. The plates are arranged angularly as shown, and are provided with shoes 382 similar to the shoes 169 in the earlier described form of the invention and secured by set screws 382a, to provide for the turning and rolling of the several strips.

The top or upper edge of each plate 380 is welded to a horizontal plate 383. Across the mill are secured three spaced rails or beams indicated by the numerals 384, 385, and 386. The spaces between these beams provide slots by which the several plates 383 may be angularly adjusted and spaced to vary the angular position of the combined knives and vanes and to vary the width of the strips. This is through the pairs of bolts 388 for each plate 383 adjustably clamped in position in the slots between the beams. As shown in Fig. 14, one of the combined knives and vanes at the center of the machine is shorter than the other so that rubber may be cut at the center and passed toward either end of the mill.

Over the top of the beams is welded a U-shaped frame 390, which serves to connect the beams in a rigid structure. Attached to the front of the frame by bolts 392 passing through slots 393 in the frame are the two spaced adjustable side boards 394 which extend down into the bite and serve as the hopper or guide chute for the rubber entering the mill. The whole unit comprising the beams and the knives and vanes and the side boards are all accommodated within the arch formed by the pivoted arms 364 which carry the movable casement sections. The means for removing the milled rubber at the ends of the roll is shown by the slitting knives 395 indicated in Fig. 14.

While this form of the invention is simpler, it lacks much of the flexibility of the preferred form. While the rubber is cut into strips and rolled and worked during its progression along the mill roll, it is impractical to change any of the instrumentalities during the running of the mill. As the vanes and shoes are not intended to be adjusted during the operation of the mill, the lower edges of the vanes and shoes may be brought down so that they touch the surface of the roll 382 or just clear the roll. The movable casement section 362 may be moved away from the roll 302 so that it is virtually idle, or it may be removed altogether.

This form of the invention is readily adaptable to existing mill structures and provides an easy method of adding the combined casement and cutting and turning knives to old type mills or the knives and vanes may be used without any casement. While the refinements of the preferred form are not found in this embodiment of the invention, the rudiments of the invention are present and where stocks are processed in large quantities of the same character, it will serve the purpose quite well.

The foregoing gives a full and complete description of several embodiments of the invention so that, having explained the principles thereof, the invention may be understood and practiced, but it is possible to create other specifically different machines which will likewise embody the new and novel features of this invention.

What is claimed is:

1. In a rubber milling machine, the combination of two rotatable rolls spaced apart to provide a restricted bite at which the rubber will form a rolling bank, one of said rolls being a feed roll and the other a work roll to which a sheet of rubber will cling after it passes the bite, a plurality of knives arranged axially along the work roll to cut the sheet of rubber into a plurality of strips, means spaced from the bite to roll each strip of rubber, after it passes the knives upon itself to form a convolute roll of rubber, said means being constructed to direct each convolute roll of rubber substantially endwise into the rolling bank at the bite.

2. In a rubber milling machine, the combination of two rotatable rolls spaced apart to provide a restricted bite at which the rubber will form a rolling bank, one of said rolls being a feed roll and the other a work roll to which a sheet of rubber will cling after it passes the bite, a plurality of knives arranged along the work roll to cut the rubber sheet at a plurality of points, and means located between each knife and the bite to roll each strip of rubber after it passes the knives into a convolute roll which is directed by said means substantially endwise into the bite, said rolling means being spaced from the rolling bank of rubber so that each convolute roll of rubber will be unconfined when it meets the rolling bank and will blend with the bank and with the rubber from other convolute rolls.

3. In a rubber milling machine, the combination of two rotatable rolls spaced apart to provide a restricted bite at which the rubber will form a rolling bank, one of said rolls being a work roll to which the rubber will cling as a sheet after it passes through the bite, and means located on the work roll to cut the sheet of rubber into strips, and means to roll each strip of rubber into a convolute roll directed substantially endwise into the rolling bank of rubber, said last named means being spaced from the rolling bank whereby each convolute roll will be unconfined as it is carried into the bank by the rotation of the work roll.

4. In a rubber milling machine, the combination of two rotatable rolls spaced apart to provide a restricted bite at which the rubber will form a rolling bank, one of said rolls being a work roll to which the rubber will cling as a sheet after it passes through the bite, means located at one point on the rolls to introduce rubber to the bite, and means at another point on the rolls to remove a strip of milled rubber from the work roll, and means to work and blend the rubber between said points and to advance the rubber toward the point of removal comprising a plurality of knives bearing against the rubber sheet on the work roll to cut the sheet into a plurality of strips, and means located between the knives and the bite to roll each strip of rubber into a convolute roll and direct the convolute roll substantially endwise into the bite.

5. In a rubber milling machine, the combination of two rotatable rolls spaced apart to provide a restricted bite at which the rubber will form a rolling bank, one of said rolls being a work roll to which the rubber will cling as a sheet after it passes through the bite, means located at one point on the rolls to introduce rubber to the bite, and means at another point on the rolls to remove a strip of milled rubber from the work roll, and means to work and blend the rubber between said points and to advance the rubber toward the point of removal comprising a plurality of knives bearing against the rubber sheet on the work roll to cut the sheet into a plurality of strips, and means located between the knives and the bite to roll each strip of rubber into a convolute roll and direct the convolute roll substantially endwise into the bite, said last named means being spaced from the bank so that the convolute rolls of rubber are unconfined as they enter the rolling bank of rubber.

6. In a rubber milling machine, the combination of two rotatable rolls spaced apart to provide a restricted bite, one of said rolls being a work roll to which the rubber will cling as a sheet after it passes through the bite, the other roll being a feed roll, means to feed rubber to the bite between the rolls, a casement located at the feeding point and surrounding but spaced from one of said rolls to hold the rubber against the roll until the rubber mats together, means to subdivide the sheet of rubber on the work roll into a plurality of strips, and means to roll each strip of rubber on itself against the surface of the work roll to form a convolute roll of rubber, said last named means being spaced from the bite and formed to direct the convolute roll of rubber toward the bite.

7. In a rubber milling machine, the combination of two rotatable rolls spaced apart to provide a restricted bite, one of said rolls being a work roll to which the rubber will cling as a sheet after it passes through the bite, the other roll being a feed roll, means to feed rubber at one point along the bite, means at another point along the work roll to remove a strip of milled and blended rubber from the work roll, a casement located at the feeding point surrounding but spaced from one of the rolls to hold the rubber against the roll until it mats together, and means located between the feeding point and the removal point to subdivide the sheet of rubber on the work roll into a plurality of strips, and means to roll each strip of rubber against the work roll to form a plurality of convolute rolls of rubber, said last named means being spaced from the bite and constructed so as to direct each convolute roll substantially endwise into the bite.

ANDREW HALE.
GILBERT V. KULLGREN.

References Cited in the file of this patent

UNITED STATES PATENTS

| Number | Name | Date |
| --- | --- | --- |
| 762,586 | Holtzhausen | June 14, 1904 |
| 1,881,994 | Banbury | Oct. 11, 1932 |
| 2,067,458 | Nichols | Jan. 12, 1937 |
| 2,097,290 | Parkin | Oct. 26, 1937 |
| 2,264,237 | Brown | Nov. 25, 1941 |
| 2,478,885 | Alvey | Aug. 9, 1949 |
| 2,519,834 | Hanson et al. | Aug. 22, 1950 |
| 2,540,195 | Engler | Feb. 6, 1951 |

FOREIGN PATENTS

| Number | Country | Date |
| --- | --- | --- |
| 436,743 | Great Britain | Oct. 17, 1935 |
| 886,266 | France | Oct. 11, 1943 |